US006866778B2

United States Patent
Kerschenmeyer et al.

(10) Patent No.: US 6,866,778 B2
(45) Date of Patent: Mar. 15, 2005

(54) TANK FOR DRAINING A GRANULAR MATERIAL/LIQUID MIXTURE

(75) Inventors: Guy Kerschenmeyer, Kleinbettingen (LU); Wolfgang Van Hooff, Helmdange (LU); Jean Hartz, Schuttrange (LU)

(73) Assignee: Paul Wurth S.A., Luxembourg (LU)

( * ) Notice: Subject to any disclaimer, the term of this patent is extended or adjusted under 35 U.S.C. 154(b) by 33 days.

(21) Appl. No.: 10/466,062

(22) PCT Filed: Dec. 24, 2001

(86) PCT No.: PCT/EP01/15305

§ 371 (c)(1),
(2), (4) Date: Jul. 10, 2003

(87) PCT Pub. No.: WO02/055177

PCT Pub. Date: Jul. 18, 2002

(65) Prior Publication Data

US 2004/0050776 A1 Mar. 18, 2004

(30) Foreign Application Priority Data

Jan. 10, 2001 (LU) .............................. 90713

(51) Int. Cl.⁷ ............................................. B01D 36/04
(52) U.S. Cl. .................. 210/305; 210/313; 210/519; 210/534; 210/540
(58) Field of Search ................................. 210/305, 312, 210/313, 519, 532.1, 534, 535, 538, 540

(56) References Cited

U.S. PATENT DOCUMENTS

| 1,344,370 | A | * | 6/1920 | Allen ........................ 210/519 |
| 2,070,201 | A | | 2/1937 | Geary |
| 2,874,842 | A | * | 2/1959 | Krofta ....................... 210/540 |
| 3,543,933 | A | | 12/1970 | Karter |
| 3,616,925 | A | * | 11/1971 | Tolman ...................... 210/313 |
| 4,184,955 | A | * | 1/1980 | Arvanitakis ................. 210/535 |
| 4,554,074 | A | * | 11/1985 | Broughton .................. 210/540 |
| 4,867,877 | A | * | 9/1989 | Hansen et al. .............. 210/313 |
| 5,132,010 | A | * | 7/1992 | Ossenkop ................... 210/540 |
| 5,770,078 | A | * | 6/1998 | Hedrick ..................... 210/540 |
| 6,568,541 | B2 | * | 5/2003 | Koreis et al. ............... 210/534 |

FOREIGN PATENT DOCUMENTS

| DE | 32 11 865 A1 | 10/1983 |
| DE | 299 15 075 U1 | 3/2000 |
| GB | 1 458 382 | 12/1976 |

* cited by examiner

*Primary Examiner*—Christopher Upton
(74) *Attorney, Agent, or Firm*—McCormick, Paulding & Huber LLP

(57) ABSTRACT

A drainage tank for granular material/liquid mixture includes a low part and a high part provided with a lid. A device for separating the liquid and the granular material is arranged in the low part. A device for evacuating excess liquid is arranged in the high part and includes a number of overflow sleeves passing through the lid. The overflow sleeves have, above the lid, an overflow edge that is adjustable in height.

13 Claims, 2 Drawing Sheets

TANK FOR DRAINING A GRANULAR MATERIAL/LIQUID MIXTURE

CROSS-REFERENCE TO RELATED APPLICATIONS

This application is entitled to the benefit of and incorporates by reference in their entireties essential subject matter disclosed in International Application No. PCT/EP01/15305 filed on Dec. 24, 2001 and Luxembourg Patent Application No. 90 713 filed on Jan. 10, 2001.

FIELD OF THE INVENTION

The present invention relates to a tank for drainage a granular material/liquid mixture.

BACKGROUND OF THE INVENTION

A granular material drainage tank is used in particular in a wet granulation plant in which a molten product is introduced into a powerful stream of water which solidifies, granulates and cools it. This operation is generally performed discontinuously in a granulating tank equipped for the injection of water of granulation. Once a batch of molten product has been poured into the granulation tank, and therefore granulated, the granular material/water mixture is pumped from the granulating tank to a drainage tank so that the granular material can be separated from the water of granulation.

Such a drainage tank generally comprises a cylindrical upper part and a conical lower part which ends in an outlet portion equipped with a shut-off member. The conical lower part is also equipped, upstream of the shut-off member, with a device for separating the water and the granular material, which comprises an annular collection chamber for the drained-off liquid and filtering surfaces separating the inside of the reservoir from the annular collection chamber. The upper part is fitted with a lid, fixed some distance from the upper edges of the upper part, so as to define a peripheral overflow slot. That represents a means of removing the excess liquid, to allow the excess water of granulation to be evacuated. A channel is arranged around the drainage tank to collect the overflowed water of granulation. The granular material/water mixture is conveyed to the tank by means of a filling line that passes through the lid. When the drainage tank is filled, the granular material is held back by the filtering surfaces, whereas the water is collected in the collection chamber. The excess, or overflow, water can flow through the means of evacuating excess liquid.

One disadvantage with such a drainage tank is that, depending on the way in which the granular material spreads out within the tank, streams of water at higher speeds can form. These streams of water at higher speeds cause greater overflowing at certain points around the periphery of the drainage tank, carrying with them fairly sizeable amounts of granular material. The overflowing of the excess water is therefore not uniform around the entire periphery of the drainage tank. In addition, the drainage tank is sometimes slightly inclined, and this further accentuates this problem of non-uniform overflow.

One problem addressed by the present invention is that of proposing a tank for draining a granular material/liquid mixture which allows the excess liquid to be removed more uniformly when the drainage tank is filled.

SUMMARY OF THE INVENTION

A tank for draining a granular material/liquid mixture according to the invention comprises a lower part and an upper part fitted with a lid. A device for separating the liquid and the granular material is arranged in the lower part. A device for removing excess liquid is arranged in the upper part. According to an important aspect of the invention, the device for removing excess liquid comprises a certain number of overflow sleeves passing through the lid. It will be appreciated that the overflow sleeves have, above the level of the lid, an overflow edge that is adjustable in height. The lid equipped with its overflow sleeves therefore constitutes an adjustable means of removing excess water. This possibility of individually adjusting the height of the overflow edge of each sleeve allows the sleeves to be set up in such a way as to obtain essentially equivalent overflows of liquid through each of them, thus ensuring uniform overflow. In general, to obtain uniform overflow, the overflow edges of the sleeves will preferably be adjusted so that they lie in one and the same horizontal plane. It will also be noted that the overflow sleeves make it possible to compensate for any inclination of the tank. A drainage tank according to the invention is particularly well suited to the drainage of a granular material/water mixture pumped from a granulating tank.

According to a preferred embodiment, an overflow sleeve comprises a vertical pipe welded, advantageously in a sealed manner, into the lid and equipped with a threaded upper end above the level of the lid. A threaded adjustment ring is screwed onto the threaded upper end of the vertical pipe. This threaded adjustment ring forms the overflow edge, and can therefore be adjusted along a vertical axis, so as to set the overflow height.

The overflow sleeves are advantageously distributed uniformly over the lid. The excess liquid therefore overflows at various points across the cross section of the drainage tank, rather than just at its periphery. This makes it possible to have essentially equal liquid speeds inside the drainage tank, across its entire cross section. The overflow speeds will therefore generally be lower, thus making for better deposition of the granular material and avoiding the entrainment of particles. Such a distribution of the sleeves contributes to uniform overflowing of the excess liquid. In order to obtain essentially equivalent liquid speeds across the entire cross section of the tank, it is possible, for example, to distribute the sleeves in such a way that they are assigned to the removal of liquid from regions of the lid that have identical surface areas.

One parameter on which the overflow depends is the total length of the overflow edges offered by the sleeves. In order to guarantee appropriate removal of the liquid, care will preferably be taken to ensure a total overflow length at least equal to that of a conventional tank with a peripheral slot. This condition entrains that the number of sleeves in the lid preferably be such that the sum of the lengths of the overflow edges of the sleeves be no shorter than the external perimeter of the drainage tank.

The lid advantageously has an essentially convex shape, e.g. conical shape, so that the liquid which has overflowed through the overflow sleeves runs toward the periphery of the lid. The liquid which has overflowed can be collected in a liquid-collecting channel running around the lid.

The device for separating the liquid and the granular material preferably comprises an annular collection chamber for the drained-off liquid and filtering surfaces separating the inside of the drainage tank from the annular collection chamber. In general, the lower part ends in an outlet portion in which a shut-off member is mounted. During the filling of the tank, the shut-off member is closed. The granular material is held by the filtering surfaces and is deposited in the drainage tank while the liquid flows through the filter surfaces and is removed via the collection chamber. The excess liquid runs though the overflow sleeves. Once the water has flowed out of the tank, the shut-off member is opened and the drained granular material is recovered, for example on a conveyor belt passing under the outlet portion or into a vat.

Once the liquid has flowed out of the drainage tank, there nonetheless remains a certain amount of water in the outlet portion, just above the shut-off member. In order to remove this residual water before opening the shut-off member, the outlet portion is advantageously equipped, just before the shut-off member, with a secondary separating device. It comprises filtering surfaces separating the inside of the outlet portion from a secondary annular collection chamber. The residual water from the outlet portion can therefore be removed via this secondary separation device.

The granular material/liquid mixture is preferably conveyed into the drainage tank by means of a filling line passing through the lid in such a way as to be coaxial with a vertical central axis of the drainage tank.

Advantageously a deflector forming an impact surface is installed below a mouth of the filling line, so that the granular material/liquid mixture leaving the filling line strikes the impact surface of the deflector. The impact surface of the deflector may for example be essentially flat or conical. The particles of granular material are therefore slowed as they hit the impact surface of the deflector, and this prevents the finer particles among them from being carried along by ascending liquid streams. In order to improve the flow of the water/granular material mixture in the tank still further, this tank is advantageously equipped with a filling chamber stretching vertically from the lid and open toward the bottom. The filling chamber surrounds the mouth of the filling line and the deflector. The cross section of the filling chamber is such that there is a passage between this chamber and the deflector for the mixture to leave. Such a structure makes it possible to limit the turbulence in the drainage tank while it is being filled, and plays a part in a uniform overflowing of the excess liquid. Still in order to limit turbulence in the drainage tank, the drainage tank advantageously comprises a guide chamber stretching vertically from the lid and open toward the bottom. The guide chamber surrounds the filling chamber and has a larger cross section than the filling chamber.

The overflow sleeves may be fitted with retention filters, so as to retain particles which get as far as the sleeves.

BRIEF DESCRIPTION OF THE DRAWINGS

Other particulars and features of the invention will become apparent from the detailed description of one advantageous embodiment set out hereinbelow, by way of illustration, and with reference to the appended drawings. These show.

DETAILED DESCRIPTION OF THE INVENTION

Figure 1:
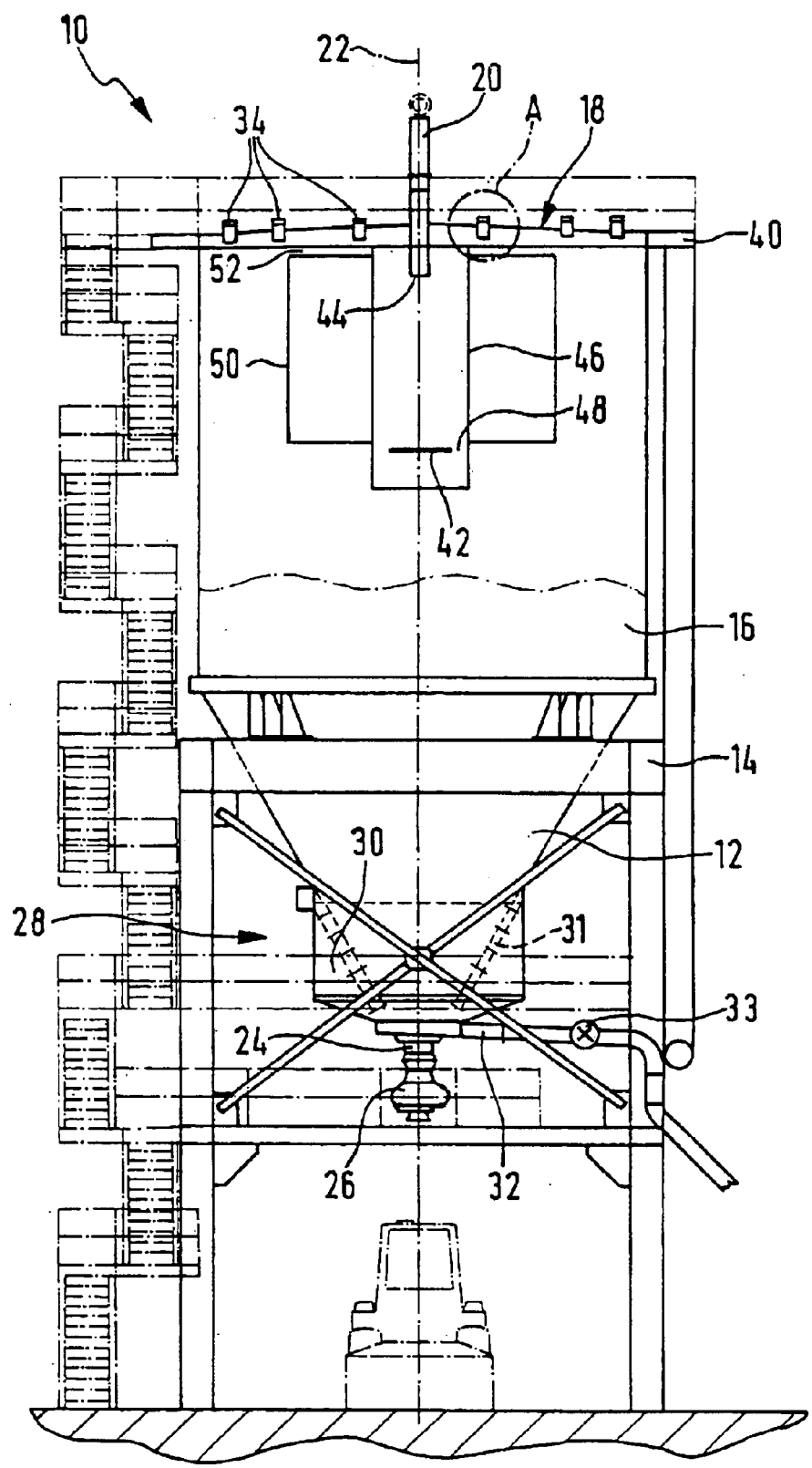
FIG. 1: a front view of a preferred embodiment of a drainage tank according to the invention, the part above the broken chain line being shown in section.

FIG. 1 illustrates a preferred embodiment of a drainage tank 10 in accordance with the invention. The drainage tank 10 comprises a lower part 12 of conical shape, supported in a framework 14, and a cylindrical upper part 16 surmounting the bottom part 12. The upper part 16 is equipped with a lid 18 covering the top of the drainage tank 10. The lid 18 has, passing through it, a filling line 20 which is used to fill the drainage tank 10 with a granular material/liquid mixture that is to be drained. This filling line 20 passes through the lid 18 in such a way as to be coaxial with a vertical central axis 22 of the drainage tank 10. The bottom part 12 ends in an outlet portion 24 equipped with a shut-off member 26. In the bottom part 12, upstream of the outlet portion 24, there is a device for separating the liquid and the granular material, generally labeled 28. The separating device 28 comprises an annular collection chamber 30 for the drained-off liquid and filtering surfaces 31 (shown as hidden detail in FIG. 1), separating the inside of the drainage tank 10 from the annular collection chamber 30. The reference symbol 32 indicates a discharge line for the drained-off liquid to leave the annular collection chamber 30. A valve 33 is preferably mounted in this discharge line 32.

It will be appreciated that the lid 18 has, passing through it, a certain number of overflow sleeves 34 which, above the level of the lid 18, have an overflow edge the height of which can be adjusted. These overflow sleeves 34 represent a device for removing excess liquid, with an adjustable overflow height. What these actually do is allow the removal of the excess liquid during the filling of the drainage tank 10. Typically, when filling the drainage tank 10, the shut-off member 26 is closed and the tank 10 is filled with the granular material/liquid mixture conveyed via the filling line 20. The granular material is retained by the filtering surfaces 31 and accumulates in the tank 10 whereas the liquid flows through the filtering surfaces 31 to then be removed by the collection chamber 30. When the tank 10 is filled with mixture up to the height of the lid 18, and the tank 10 continues to be filled, the excess liquid flows out through the overflow sleeves 34. It will be noted that, as the tank 10 is filled, the valve 33 is advantageously kept shut until the level of granular material in the bottom part 12 of the tank 10 is above the filtering surfaces 31. Once this level of granular material has been reached, the valve 33 is opened and the liquid is filtered through the deposited granular material then through the filtering surfaces 31 before entering the annular collection chamber 30. By adopting this procedure, the granular material is used as an additional filtering means, and the filtering of the liquid in the drainage tank 10 is more effective.

Figure 2:
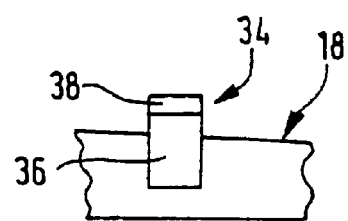
FIG. 2: an enlarged view of detail A of FIG. 1.
Figure 3:
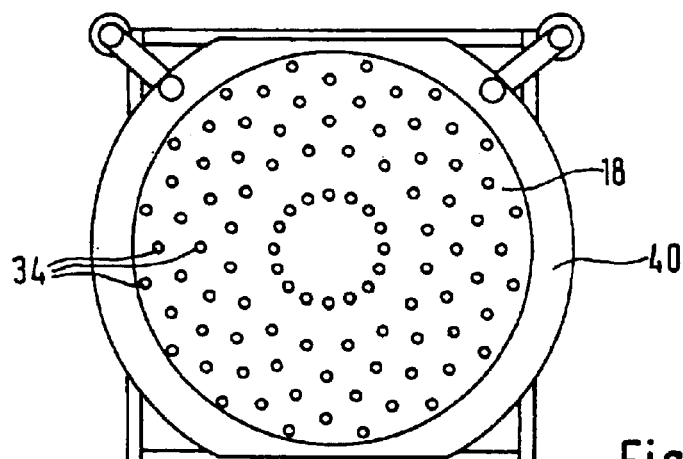
FIG. 3: a view from above of the tank of FIG. 1, without the filling line.

As can best be seen in FIG. 2, an overflow sleeve 34 comprises a vertical pipe 36 which is welded in a sealed manner into the lid 18 and which has a threaded upper end above the level of the lid 18. Screwed onto this threaded upper end is a threaded adjustment ring 38, which forms the overflow edge of the overflow sleeve 34. The overflow sleeves 34 are therefore individually adjustable. To guarantee uniform overflowing of the excess liquid through all the overflow sleeves 34, their overflow edges are generally set so that they lie in one and the same horizontal plane. It will be noted that this possibility of individual adjustment in particular makes it possible to compensate for any inclination of the drainage tank 10. In addition, the overflow sleeves 34 are preferably distributed uniformly across the lid 18, as shown in FIG. 3, so that they are assigned to the removal of liquid from regions of the lid 18 which have identical surface areas. That makes it possible to have essentially equal liquid speeds across the entire cross section of the tank 10. It will also be noted that, in this preferred embodiment, it is desirable for the overflow length offered by the sleeves 34 not to be shorter than the overflow length offered by a conventional drainage tank with a peripheral slot, that is to say its perimeter. For example, if the diameter of each sleeve 34 is denoted Dm, the diameter of the tank 10 is denoted Dr, and the number of sleeves 34 is denoted Xm, then the abovementioned condition translates as $Xm \times (Dm \times \pi) \geq (Dr \times \pi)$. The number of sleeves Xm must therefore preferably be greater than the ratio Dr/Dm.

In FIG. 1, it can be seen that the lid 18 has a conical shape, which means that the liquid which has overflowed through the sleeves 34 runs toward the periphery of the lid 18. A collecting channel, indicated by the reference symbol 40 in FIGS. 1 and 3, runs around the lid 18 to collect the liquid running off the lid 18.

In FIG. 1, the reference symbol 42 indicates a disk-shaped deflector fixed under the mouth 44 of the filling line 20. This deflector 42 is centered with respect to the central axis 22 of the tank 10 and forms a roughly horizontal impact surface. It will be noted that the mouth 44 of the filling line 20 and the deflector 42 lie inside a cylindrical filling chamber 46 stretching vertically from the lid 18 and open downward. The deflector 42 is fixed to the walls of the filling chamber 46. The cross section of the filling chamber 46 is such that there is an annular space 48 between the deflector 42 and the filling chamber 46 for the passage of the mixture. The mixture conveyed by the filling line 20 therefore first of all enters the chamber 46 and strikes the impact surface, on which it is slowed, then leaves the chamber 46 via the annular space 48. The use of the deflector 42 at the entry to the tank 10, supplemented by the chamber 46, makes it possible to limit turbulence inside the tank 10.

In order to limit still further the turbulence inside the tank 10, a cylindrical guide chamber 50 is provided, this stretching vertically and being open downward. The guide chamber 50 surrounds the filling chamber 46 and is fixed some distance from the lid 18, so that at the top of the guide chamber 50 there is an annular slot 52 for the passage of the liquid. The cross section of the guide chamber 50 is greater than that of the filling chamber 52.

Figure 4:
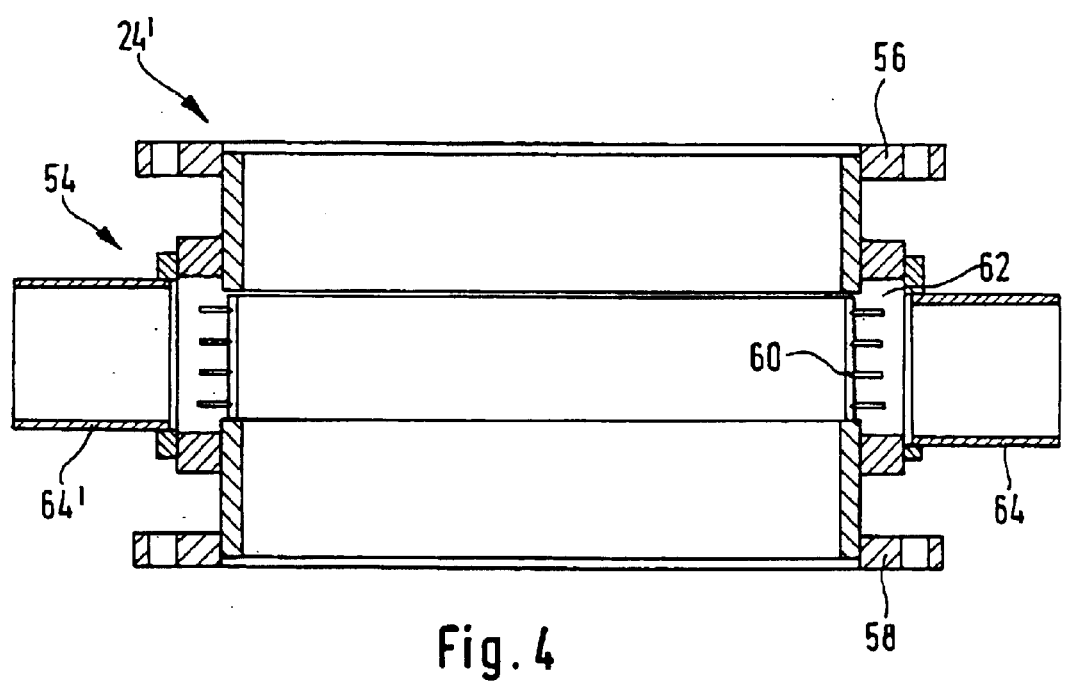
FIG. 4: a view in vertical section of an outlet portion equipped with a secondary separating device.

Once filling is complete and the liquid has flowed out of the tank 10 via the separating device 28, some liquid generally remains in the outlet portion 24 between the bottom of the separating device 28 and the shut-off member 26. If this residual liquid is not removed, it flows out with the drained granular material when the shut-off member 26 is opened. To overcome this problem, a secondary separating device may be mounted at the outlet portion 24. This is illustrated in FIG. 4, where an outlet portion 24', similar to the one in FIG. 1, is equipped with a secondary separating device generally indicated 54. The outlet portion 24' is equipped with an upper flange 56 for connecting it to the separating device 28 and with a lower flange 58 for connecting it to the shut-off member 26. The secondary separating device 54 comprises essentially annular filtering surfaces 60 which separate the inside of the outlet portion 24' for a secondary annular collection chamber 62. The liquid lying in the outlet portion 24' can therefore flow through the filtering surfaces 60 and the granular material is retained inside the outlet portion 24'. The reference symbols 64 and 64' indicate two secondary discharge lines for the liquid to leave the secondary collecting chamber. The secondary discharge lines 64 and 64' are advantageously each fitted with a secondary valve (not shown), which valves would preferably be operated like the valve 33 of the separating device 28.

What is claimed is:

1. A drainage tank for draining a granular material/liquid mixture comprising:

a lower part and an upper part fitted with a lid;

a device for separating the liquid and the granular material and arranged in said lower part;

a device for removing excess liquid and arranged in said upper part; wherein said device for removing excess liquid comprises a plurality of overflow sleeves passing through said lid, said overflow sleeves having, above the level of said lid, an overflow edge that is adjustable in height.

2. The drainage tank as claimed in claim 1, wherein each said overflow sleeve comprises:

a vertical pipe welded into said lid, said vertical pipe having a threaded upper end above the level of said lid; and a threaded adjustment ring which is screwed onto said threaded upper end of said vertical pipe, said threaded adjustment ring forming said overflow edge.

3. The drainage tank as claimed in claim 1, wherein said overflow sleeves are distributed uniformly over said lid.

4. The drainage tank as claimed in claim 1, wherein said upper part of the drainage tank has a diameter and the number of overflow sleeves with which said lid is equipped is chosen so that the sum of the diameters of said overflow edges of said overflow sleeves is no less than said diameter of said upper part of the drainage tank.

5. The drainage tank as claimed in claim 1, wherein said lid has an essentially convex shape so that the liquid which has overflowed through said overflow sleeves runs toward the periphery of said lid.

6. The drainage tank as claimed in claim 1, further comprising a liquid-collecting channel running around said lid.

7. The drainage tank as claimed in claim 1, wherein said drainage tank has an inside; and said device for separating the liquid and the granular material comprises an annular collection chamber for the drained-off liquid and filtering surfaces separating the inside of said drainage tank from said annular collection chamber.

8. The drainage tank as claimed in claim 1, further comprising an outlet portion ending said lower part of said drainage tank, in which a shut-off member is mounted; and by a secondary separating device mounted in said outlet portion upstream of said shut-off member, said secondary separating device comprising filtering surfaces separating the inside of the outlet portion from a secondary annular collection chamber.

9. The drainage tank as claimed in claim 1, further comprising a filling line of said drainage tank, which passes through said lid in such a way as to be coaxial with a vertical central axis of said drainage tank.

10. The drainage tank as claimed in claim 9, further comprising a deflector forming an impact surface below a mouth of said filling line, so that the granular material/liquid mixture leaving said filling line strikes said impact surface of said deflector.

11. The drainage tank as claimed in claim 10, further comprising a filling chamber stretching vertically from said lid and open downwards, said filling chamber surrounding said mouth of said filling line and said deflector, and the cross-section of said filling chamber being such that there is a space between this chamber and said deflector.

12. The drainage tank as claimed in claim 11, further comprising a guide chamber stretching vertically from said lid and open downwards, said guide chamber surrounding said filling chamber and having a larger cross-section than said filling chamber.

13. The drainage tank as claimed in claim 1, further comprising a retention filter in the overflow sleeves.

* * * * *